Aug. 19, 1958     N. L. CAMPBELL     2,848,036
SAFETY APPLIANCE FOR CHILD'S SEAT
Filed May 11, 1956     2 Sheets-Sheet 1

Norman L. Campbell INVENTOR.
BY Bush & Bush.
His Attorneys.

Aug. 19, 1958     N. L. CAMPBELL     2,848,036
SAFETY APPLIANCE FOR CHILD'S SEAT

Filed May 11, 1956     2 Sheets-Sheet 2

Norman L. Campbell INVENTOR.
BY Bush Bush
His Attorneys.

United States Patent Office 2,848,036
Patented Aug. 19, 1958

2,848,036

SAFETY APPLIANCE FOR CHILD'S SEAT

Norman L. Campbell, Davenport, Iowa

Application May 11, 1956, Serial No. 584,323

6 Claims. (Cl. 155—11)

My invention relates to a safety fastening for seats for infants or very young children.

The objects of my invention are to provide a simple, inexpensive means easily applied, for securing a small raised seat in place upon the seat of an automobile against accidental displacement, to provide means by which an infant's raised seat, when carried upon either the front or back seat of an automobile or other vehicle, may be held in place and a child thereon protected against being thrown forwardly in case of a collision, sudden stoppage or bad bumps or other incidents producing shocks thereto.

I accomplish these objects by the means shown in the accompanying drawings, in which—

In the specification and claims I use the term "chair" to include a seat to be placed upon or secured to an automobile seat to hold a small child in a raised position that will enable him to see out of the windows of the car and also to see ahead, and to distinguish it from an upholstered seat of an automobile or other vehicle, which I refer to as "the seat."

In the claims I use the term "detent" to refer to the block 12 or to any suitable material, as one to be used to restrict the movement thereof between the two cushions contacted by it.

Figure 4:
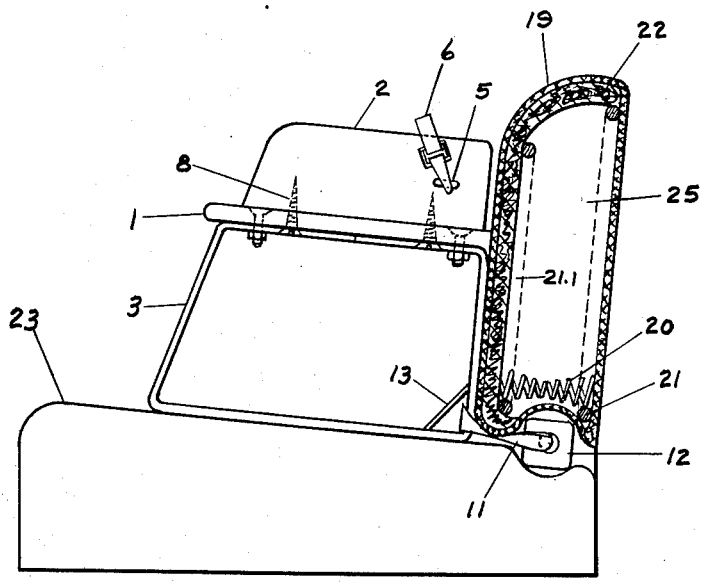
Figure 4 is a sectional detail showing the position of my appliance with reference to the seat-back and seat cushion of an automobile in which it is placed.

The chair to which my appliance is attachable is preferably formed with a light wood bottom 1 bolted to and mounted upon a pair of rectangular side frames 3—3. The side frames are preferably light, flat bars of aluminum. Arms 2—2 are secured to the top frame members by screws 8 as shown in Figure 4. The bottom 1 and arms 2—2 are preferably of light wood, but may be of any suitable material.

Figure 5:
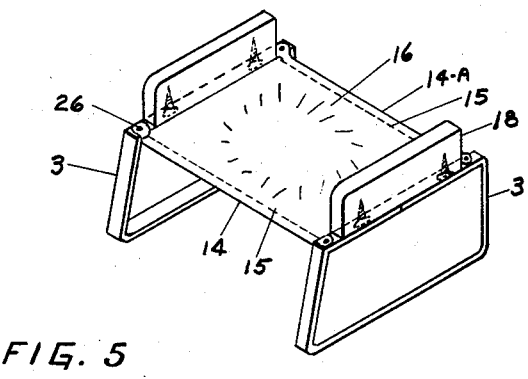
Figure 5 is a perspective view showing an alternate form of chair.

An alternate form of chair is shown in Figure 5 in which the chair bottom 16 is of canvas or other suitable fabric, passing over parallel bars at 14—14A and stitched at 15—15 to form a tube through which parallel bars may be inserted and the ends of said bars are flattened and may be secured to the top members of the side frames by rivets 26 as shown in Figure 5, or other suitable means.

A belt 6 with a buckle 7 is adjustably attached to eyebolts 5 by links 4 and the bolts are secured in the arms 2—2, to secure a child in the chair.

A short diagonal brace 13 is united to the bottom and rear members of the frames 3—3.

My safety appliance comprises adjustable belts 11 with buckles 10. Each belt 11 is passed through an opening between the brace 13 and the frame 3. At the rear of the belt 11 a light rectangular bar 12 of wood or other suitable material, with rounded corners, is mounted having a longitudinal bore 17 formed therein through which the belt 11 passes.

In applying my chair to an automobile seat, the chair is placed with the frames 3 resting upon the top of the automobile seat 23 and in contact with the front of the back cushion 24.

It is common practice for a seat-back to carry front and rear rectangular metal frames such as 21—21.1 upon which a plurality of double conical coiled springs 20 are carried, with interlacing wires or springs to form a back for the padding 22 covered by a fabric covering 19.

The seat-backs are resilient and permit the introduction of the blocks 12 which can extend upwardly high enough so that the padding 2 and its front frame 21 will prevent forward movement of the blocks 12.

The positions of the blocks 12 are further secured by the padding of the seat 23 which is also resilient enough to aid in placing the blocks 12 as indicated.

The blocks or bars 12 may be of any size and length desired, but when made aproximately five or six inches in length and about one or one and a half inches in diameter, will be of a size and shape which will readily permit insertion by manually pressing down upon the seat cushion and upwardly against the seat-back. They can also be removed by turning the blocks crosswise of the seat-back.

The pressure of the padding and of the frame 21.1 will be sufficient to hold the blocks against displacement by stopping of the automobile.

Figure 1:
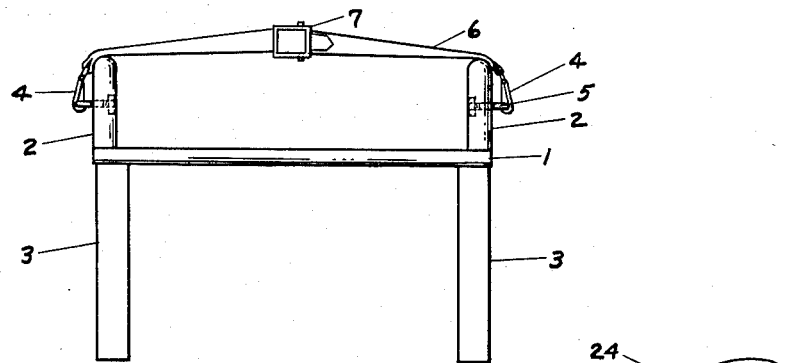
Figure 1 is a front elevation of a child's seat adapted to be carried upon the seat of an automobile and to which my appliance may be attached.
Figure 2:
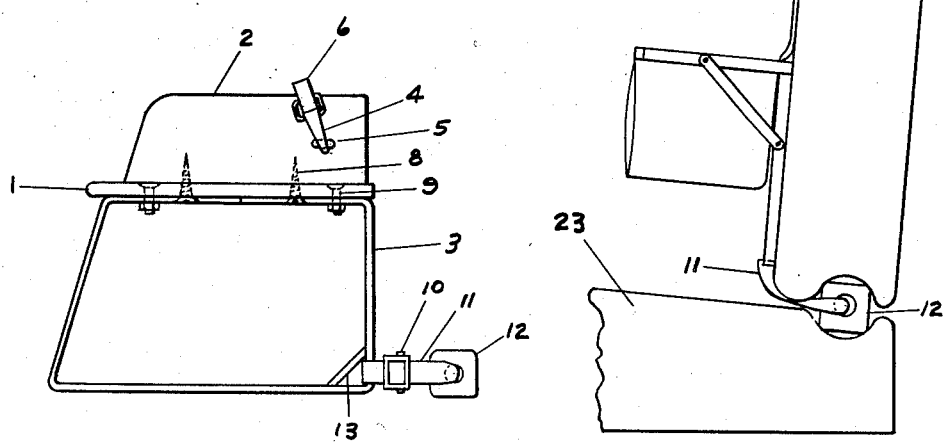
Figure 2 is a side elevation showing my appliance attached to a lower rear corner of the supporting frame of such chair.
Figure 6:
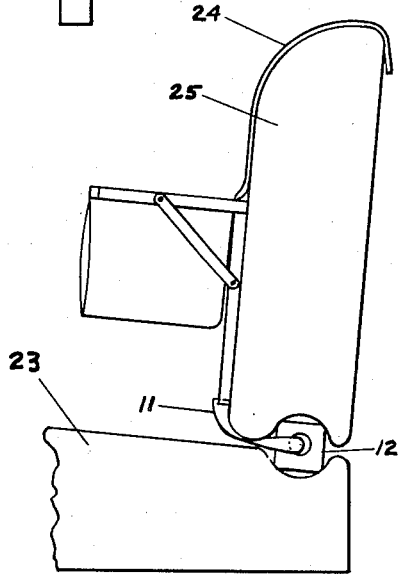
Figure 6 shows a fractional view of my appliance attached to another common form of portable chair secured to the seat-back of an automobile.
Figure 3:
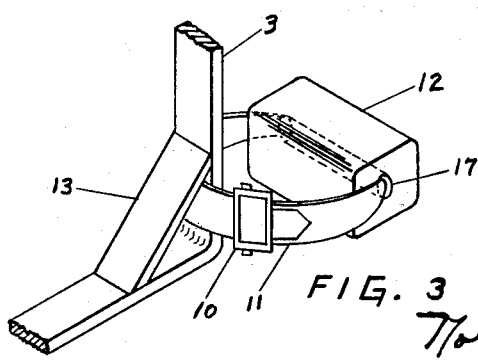
Figure 3 is a perspective detail showing my appliance and the method of attaching it to the chair.

In chairs of the form shown in Figure 6, the chair is supported by metal hooks 24 which extend over the top of the automobile seat back 25, but with nothing to prevent the seat from swinging forwardly. With such chairs, the bars 24 may be extended below the chair and my belt 11 connected therewith.

Various modifications may be made in the size, shape and material of the parts without departing from the spirit of my invention as expressed in the claims, and I do not limit my claims to the precise forms shown in the drawings.

I claim:

1. In connection with a child's chair having a pair of rectangular side frames forming supports for the chair and adapted to rest upon the seat of an automobile and in contact with a padded back of such seat, a safety appliance including belts passing over the bottom members of said frames respectively and in front of the rear members thereof and extending rearwardly therefrom, each belt having a block of wood mounted at the rear thereof of several inches in length and approximately one and one-half inches in diameter and having a longitudinal bore through which the belt passes, said belts being of sufficient length to permit the blocks being manually placed between the lower edge of the seat-back of the automobile and the seat cushion, whereby they will prevent the chair being thrown forwardly by a sudden stoppage of the automobile.

2. In connection with an automobile seat having a horizontal padded seat with a vertical resilient backrest adjacent thereto a safety appliance as described in claim 1, the blocks being manually placeable between the rear portion of said cushion and intermediate the lower edge of a resilient seat-back having padding and front and rear wire frames therein whereby the padding and the front frame of the back will act to resist forward displacement of the blocks.

3. The combination with an automobile seat having a horizontal padded seat with a vertical resilient backrest adjacent thereto, of a chair for children, having rectangular supporting side frames adapted to rest upon the seat of an automobile and in contact with a resilient seatback, flexible belts passing through the frames respectively and extending rearwardly with blocks several inches in length and from an inch to an inch and a half in thickness and width, united to the rear of said belts and adapted for manual placement between the lower edge of the seat-back and the top of the seat cushion of the automobile in which the chair is placed.

4. In connection with a seat of the automobile type having a padded horizontal seat cushion and a padded backrest a child's chair having a pair of rectangular side frames forming supports for the chair and adapted to rest upon the seat and in contact with a padded back of such seat, a safety appliance including adjustable belts passing over the bottom members of said frames respectively and in front of the rear members thereof and extending rearwardly therefrom, each belt having a block of wood mounted at the rear thereof several inches in length and approximately one and one-half inches in diameter and having a longitudinal bore through which the belt passes, said belts being of sufficient length to permit the blocks being manually placed between the lower edge of the seat-back of the automobile and the seat cushion, whereby they will prevent the chair being thrown forwardly by a sudden stoppage of the automobile.

5. For use in connection with an automobile seat having a padded horizontal cushion and a padded vertical cushion with a resilient rectangular wire frame in the front thereof, a child's chair carried thereby and having rectangular side frames including bottom and rear members forming supports for the chair and adapted to rest upon the cushioned seat having a resilient padded back and in contact with said back, a safety appliance including flexible adjustable belts passing over the bottom members of said frames respectively and in front of the rear members thereof and extending rearwardly therefrom, each belt having a detent mounted at the rear thereof several inches in length and about one inch in diameter with a longitudinal bore through which the belt passes, said belts being of sufficient length to permit the detents being manually placed between the middle of the lower edge of the padded back and the seat cushion, whereby they will retard or prevent the chair being thrown forwardly by sudden stoppage of the automobile.

6. A safety appliance as described in claim 5, and small diagonal braces united to the bottom and rear members of the chair frames whereby the belts may be secured against displacement.

References Cited in the file of this patent

UNITED STATES PATENTS

| | | |
|---|---|---|
| 1,204,390 | Armstead | Nov. 14, 1916 |
| 2,172,890 | Phillips | Sept. 12, 1939 |
| 2,482,827 | Black | Sept. 27, 1949 |
| 2,560,925 | Brown | July 17, 1951 |
| 2,601,890 | Smith | July 1, 1952 |
| 2,642,923 | Roeder | June 23, 1953 |
| 2,704,116 | Scanlon | Mar. 15, 1955 |
| 2,714,417 | Golding | Aug. 2, 1955 |